United States Patent
Early et al.

(10) Patent No.: US 10,018,246 B2
(45) Date of Patent: Jul. 10, 2018

(54) HIGH SPEED FLYWHEEL

(71) Applicant: Flybrid Automotive Limited, Birmingham (GB)

(72) Inventors: Andrew Early, Banbury (GB); Jonathan James Robert Hilton, Banbury (GB); Douglas Isaac Lascelles Cross, Milton Keynes (GB)

(73) Assignee: Flybrid Automotic Limited, Birmingham (GB)

( * ) Notice: Subject to any disclaimer, the term of this patent is extended or adjusted under 35 U.S.C. 154(b) by 88 days.

(21) Appl. No.: 15/071,061

(22) Filed: Mar. 15, 2016

(65) Prior Publication Data

US 2016/0265622 A1 Sep. 15, 2016

Related U.S. Application Data

(63) Continuation of application No. 13/061,474, filed as application No. PCT/GB2009/050909 on Jul. 23, 2009, now Pat. No. 9,303,721.

(30) Foreign Application Priority Data

Sep. 8, 2008 (GB) .................. 0816359.4

(51) Int. Cl.
*F16F 15/31* (2006.01)
*F16F 15/315* (2006.01)

(52) U.S. Cl.
CPC .......... *F16F 15/3156* (2013.01); *Y02E 60/16* (2013.01); *Y10T 74/2117* (2015.01)

(58) Field of Classification Search
CPC ...... F16F 15/30; F16F 15/315; F16F 15/3156; Y02T 10/6204; Y02E 60/16; B60K 6/105
See application file for complete search history.

(56) References Cited

U.S. PATENT DOCUMENTS

| 4,208,921 A | 6/1980 | Keyes |
| 6,144,128 A | 11/2000 | Rosen |
| 6,481,720 B1 | 11/2002 | Yoshida et al. |
| 7,051,617 B2 | 5/2006 | Smith et al. |
| 7,464,941 B2 | 12/2008 | Hashimoto |

(Continued)

FOREIGN PATENT DOCUMENTS

| EP | 0181736 | 5/1986 |
| EP | 0480694 | 10/1990 |

(Continued)

OTHER PUBLICATIONS

International Search Report for PCT/GB2009/050909 dated Sep. 10, 2009.

(Continued)

*Primary Examiner* — Thomas C Diaz
(74) *Attorney, Agent, or Firm* — Knobbe Martens Olson & Bear LLP

(57) ABSTRACT

A high speed flywheel system, including a flywheel mounted on a shaft, the flywheel being located within an evacuated chamber within a housing, wherein the chamber is sealed by seals including a cavity containing sealing fluid, wherein the seal cavity can be topped up with sealing fluid from a reservoir, the reservoir having an aperture open to the atmosphere for pressure equalization, the flywheel housing being mounted on the shaft via a bearing arrangement including at least one bearing situated externally to the chamber.

22 Claims, 11 Drawing Sheets

(56) References Cited

U.S. PATENT DOCUMENTS

2004/0201179 A1   10/2004   Iwakata et al.
2010/0013167 A1   1/2010    Bachhofner et al.

FOREIGN PATENT DOCUMENTS

| GB | 1492965 | 11/1977 |
| GB | 2121124 | 12/1983 |
| GB | 2448930 | 11/2008 |
| JP | 55-036641 | 3/1980 |
| JP | 58-037352 | 3/1983 |
| JP | 61-099738 | 5/1986 |
| JP | 2006-038209 | 2/2006 |
| JP | 2007-100901 | 4/2007 |
| WO | WO 02/053911 | 7/2002 |
| WO | WO 03/092878 A2 | 11/2003 |
| WO | WO 2007/124830 | 11/2007 |

OTHER PUBLICATIONS

English translation of Japanese Office Action, issued in Japanese Patent Application No. 2011-525616, dated Sep. 3, 2013.
European Office Action dated Jun. 25, 2013 in European Patent App. No. 09 785 383.2.
British Search Report dated Jan. 6, 2009 in British Patent App. No. GB0816359.4.
English translation of Chinese Office Action dated Aug. 31, 2012 in Chinese Patent App. No. 200980135172.7.
International Preliminary Examination Report dated Oct. 9, 2009 in International Patent App. No. PCT/GB2009/050909.
Office Action dated Feb. 28, 2018 for Indian Patent Application No. 1519/DELNP/2011.

HIGH SPEED FLYWHEEL

CROSS-REFERENCE TO RELATED APPLICATIONS

This application is a continuation of U.S. patent application Ser. No. 13/061,474 filed on May 16, 2011, which is incorporated by reference herein for all purposes and is the U.S. National Phase under 35 U.S.C. § 371 of International Application No. PCT/GB2009/050909, filed Jul. 23, 2009, designating the United States and published in English on Mar. 11, 2010, as WO 2010/026401, which claims priority to United Kingdom Application No. 0816359.4, filed Sep. 8, 2008.

FIELD

This invention relates to high speed flywheels, and particularly to bearings for high speed flywheels for use in vehicles.

DESCRIPTION OF RELATED ART

The use of high speed flywheels in vehicles is known, for example, for braking energy storage and recovery systems, whereby kinetic energy is recovered on braking of the vehicle.

Flywheels typically comprise a relatively heavy mass, mounted on a shaft and arranged to rotate with the shaft. High speed flywheels are usually contained in a chamber within a housing, a vacuum being applied to the chamber, in order to reduce energy losses caused by drag, and prevent the temperature of the flywheel from rising too high as a result of friction with surrounding air. A seal is provided between the housing and the shaft in order to allow a vacuum to be maintained within the chamber.

Bearings are provided to rotatably couple the housing to the shaft. Currently known bearings for high speed flywheels include high grade rolling element bearings, positioned between the seals and the flywheel, i.e. inside the vacuum sealed chamber containing the flywheel.

Problems associated with the above type of flywheel bearing include a restricted choice of bearing lubricant. The lubricant must be of a type which does not vaporise at the pressure of the evacuated flywheel chamber. It is also difficult to maintain the lubricant within the bearing without the use of a touching seal or lip seal; the use of such a seal is undesirable because makes it difficult to pump the chamber down to a vacuum, and because the lubricant is likely to leak during pump down.

Current flywheel seals may also include sliding pistons in the seal mechanism, which are exposed to sealing fluid on one side and to the atmosphere on the other side. The pistons are movable in accordance with the expansion of the sealing fluid as it becomes heated on operation of the flywheel, thereby maintaining the sealing fluid at atmospheric pressure and preventing excessive pressure building. Although such pistons are aimed at allowing equalisation of the pressure on each side of the piston, a small amount of friction between the piston seal and the piston housing prevents complete equalisation of the pressure on each side of the piston.

A flywheel seal is ideally filled with sealing fluid once for the life of the seal. The condition of the sealing fluid will deteriorate with time; small particles from the seals may wear off and contaminate the sealing fluid, or the fluid may start to degrade with temperature cycles. The life of the seal may be limited by the condition of the sealing fluid within it.

If leakage of sealing fluid into the evacuated chamber occurs as a result of wear of the seal, the sealing fluid must be replaced manually, therefore increasing maintenance requirements, and reducing service life of the seal.

SUMMARY

It is an aim of the present invention to overcome or at least mitigate the above problems.

Accordingly the present invention provides a high speed flywheel as comprising a flywheel and a shaft, the flywheel being located within a chamber within a housing, wherein the chamber is evacuated and sealed by at least one seal comprising a cavity containing sealing fluid to an optimum level, the housing being mounted on the shaft via a bearing arrangement comprising at least one bearing situated externally to the chamber.

The location of the bearings outside the evacuated chamber in the present invention allows the bearings to be lubricated by any suitable fluid; it is not necessary to use a fluid which does not vaporise at the near-vacuum pressure of the evacuated chamber.

Therefore the most efficient conventional bearing lubricant can be chosen to provide that the bearings have a longer life than that of prior art embodiments. Accordingly, the permissible load ratings for the bearings are higher than those of prior art embodiments having bearings that are located inside the evacuated chamber, and the bearings can therefore be smaller, lighter, and of lower friction and cost.

A fluid reservoir may be provided for topping up the sealing fluid, for example if any fluid is caused to leak. The sealing reservoir can provide that any fluid that leaks from the seals due, for example, to wear incurred in service, can be automatically topped up. The service intervals and maintenance costs of the seals are therefore reduced.

The fluid reservoir may be open to the atmosphere. Pressure-balancing pistons required as used in certain prior art embodiments are therefore unnecessary, and therefore problems such as pressure imbalances caused by piston friction are eliminated.

The sealing fluid may be supplied via an opening near the bottom of the seal cavity, with a second opening being provided near the top of the seal cavity to allow fluid to escape, thereby allowing a constant through flow of fluid, hence extending service intervals and easing maintenance requirements due to lack of necessity for manual top-up of fluid. The flow of sealing fluid may also be directed past the flywheel bearings, in order to provide lubrication and cooling.

The sealing fluid reservoir may be topped up from a lubrication system of the flywheel drive mechanism.

Evacuation of the chamber prior to use of the flywheel is preferably via a vacuum port located on or near to the bottom of the chamber. The location of the vacuum port thereby allows for recovery of any sealing fluid which has wept past the seal, and re-use of the recovered sealing fluid.

Preferably an on-board pump is provided to scavenge, i.e. recover, any leaked fluid from the bottom of the evacuated chamber. The pump is preferably connected to the bottom of the evacuated chamber. The pump can initially scavenge any sealing fluid from the bottom of the chamber, and then top-up the vacuum level. The sealing fluid scavenged from the bottom of the chamber may then be returned to the fluid reservoir and re-used, providing cost and maintenance advantages.

When the sealing fluid reservoir has been topped up from a lubrication system for the flywheel drive mechanism, sealing fluid scavenged from the bottom of the chamber may be returned to the lubrication system.

In an alternative embodiment, a pair of angular contact bearings is positioned at one end of the shaft, with the seal on the flywheel side of the bearing arrangement. The other end the shaft is supported by a bearing allowing axial displacement, the seal again being provided on the flywheel side of the bearing arrangement. This embodiment allows relative axial movement of the bearing arrangements at each end of the flywheel shaft. Such movement also compensates for different coefficients of thermal expansion of the flywheel shaft and vacuum chamber, and different working and non-working temperatures. Relative axial movement of the bearing arrangement also allows for deflection of the vacuum chamber due to a lower internal chamber pressure than the external environment pressure.

In a further alternative embodiment, the bearing arrangement comprises a cantilevered flywheel bearing arrangement. In this embodiment, the flywheel is mounted at one end of the flywheel shaft, and the bearings are located between the flywheel and the shaft. The seal is positioned on the flywheel side of the bearings. This arrangement provides an advantage that only one seal is required.

Part or all of the flywheel may be formed integrally with the shaft. For example, a web of the flywheel may be formed integrally with the shaft.

BRIEF DESCRIPTION OF THE DRAWINGS

An embodiment of the present invention will now be described by way of example and with reference to the accompanying drawings in which:

FIGS. 4b and 4c are partial cross-sectional views corresponding to FIGS. 4a and 4b respectively;

DETAILED DESCRIPTION

Figure 1:
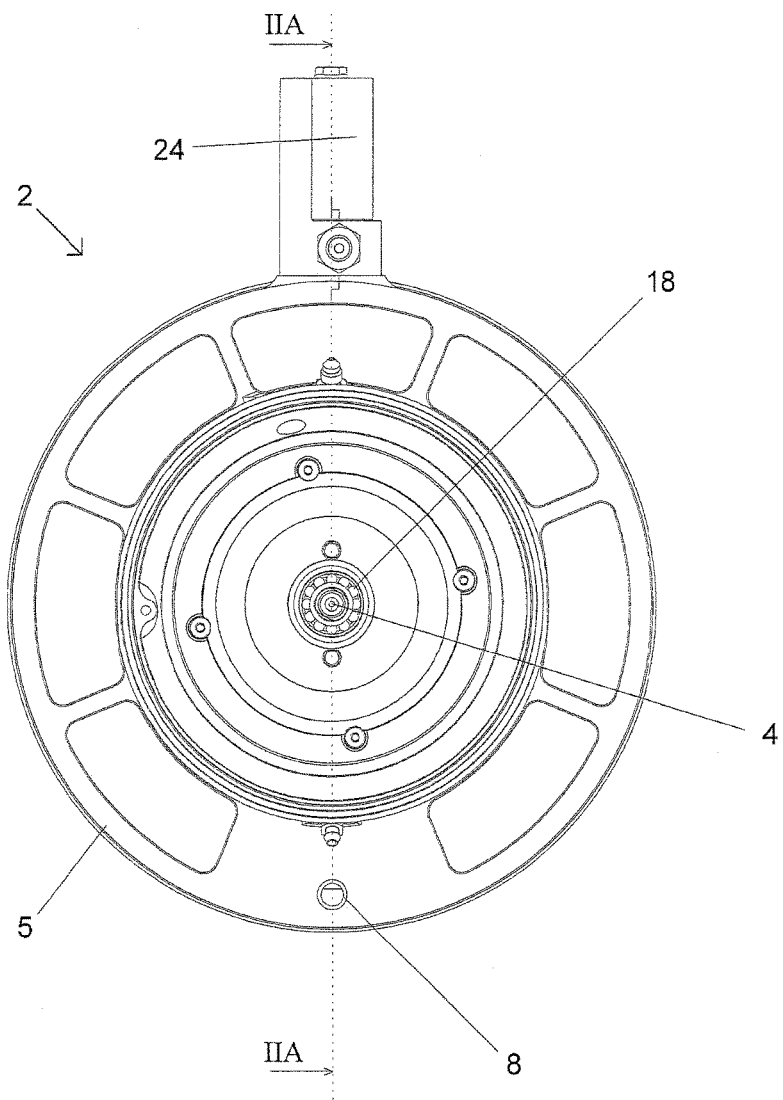
FIG. 1 is a front elevation of a flywheel in accordance with the present invention.
Figure 2A:
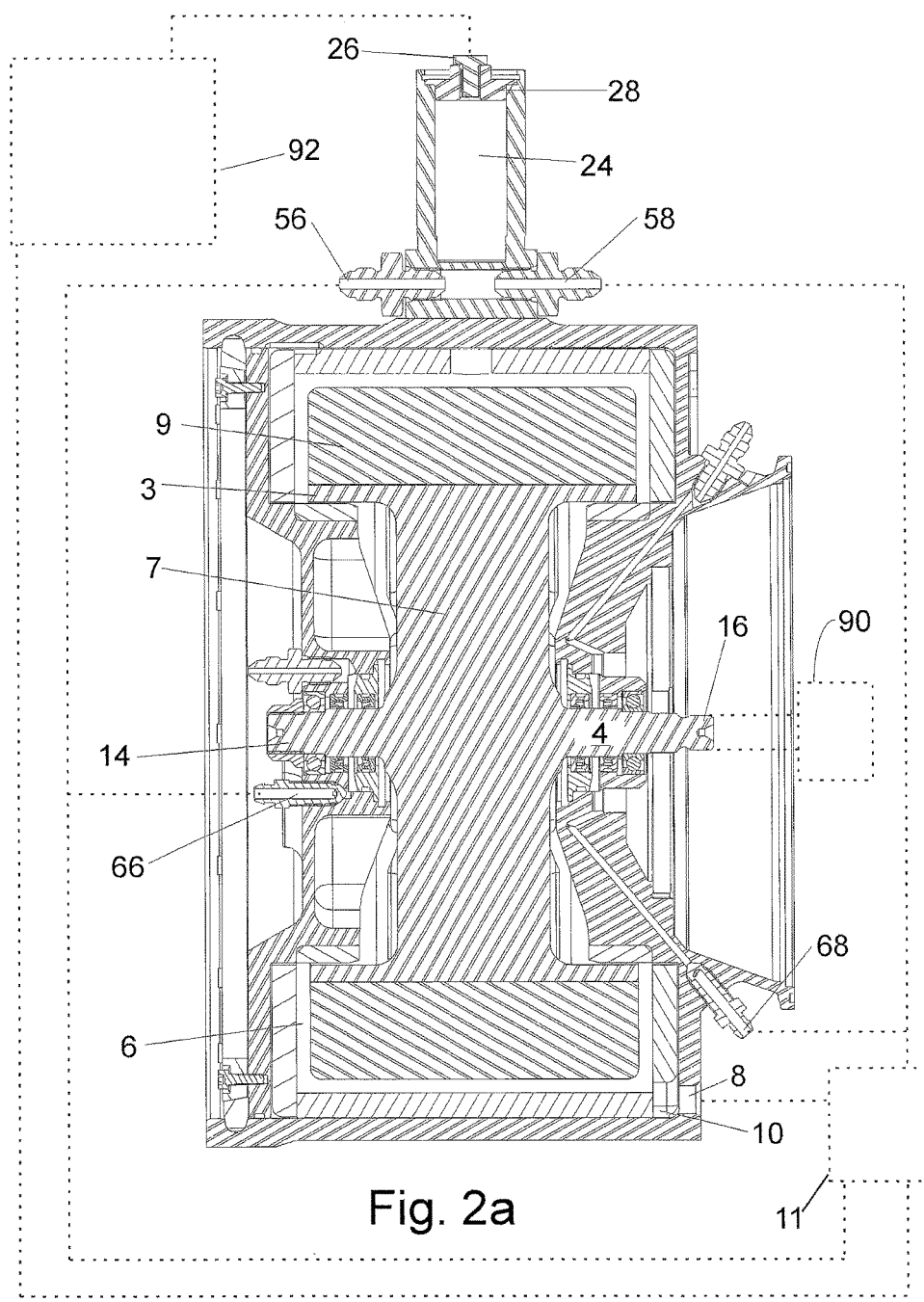
FIG. 2a is a cross-sectional view of the flywheel of FIG. 1 along the line IIA-IIA.
Figure 2B:
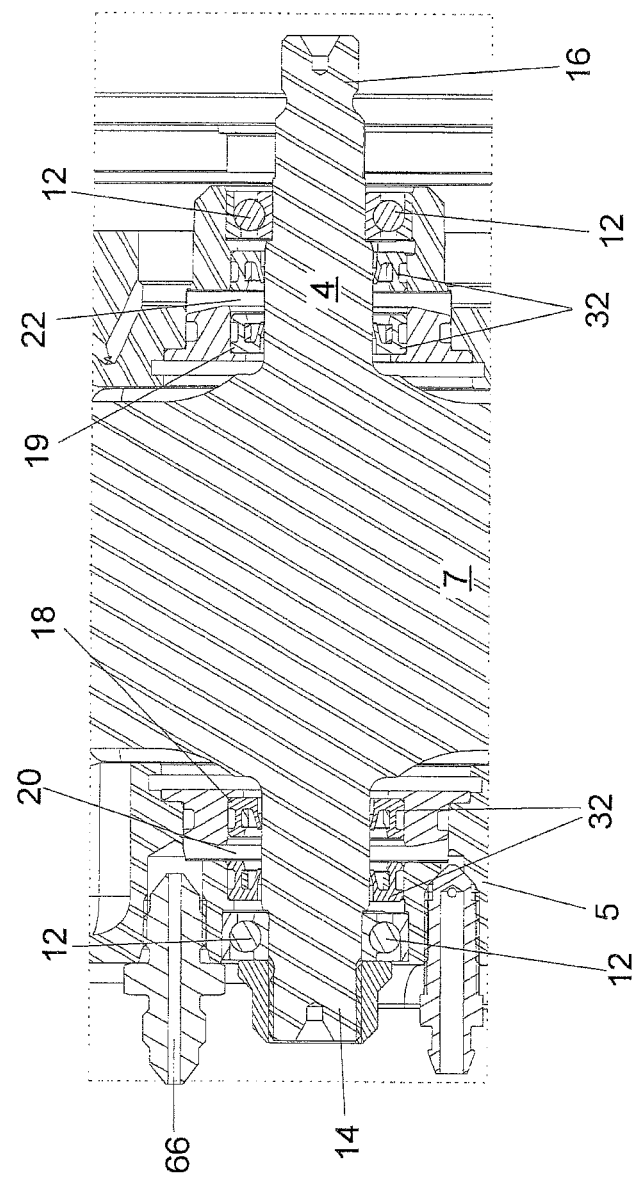
FIG. 2b is a partial cross-sectional view of the flywheel of FIG. 1 along the line IIB-IIB.

Referring to the embodiment of FIGS. 1, 2a and 2b, the flywheel arrangement 2 comprises a flywheel 3 contained within a housing 5 mounted on a shaft 4. The flywheel 3 comprises a web 7 and a rim 9. The web 7 of the flywheel 3 is formed integrally with the shaft 4.

The housing 5 contains a chamber 6 which has been evacuated by a vacuum pump 11, via a vacuum port 8. The housing 5 is mounted on the shaft 4 by rolling element bearings 12 which are provided near to each end 14, 16 of the flywheel shaft 4. Seal arrangements 18, 19 are located against the shaft 4, between each bearing 12 and the web 7 of the flywheel 3. The seal arrangements 18, 19 each comprise lip seals 32 and a first cavity 20 and a second cavity 22 containing sealing fluid (not shown).

A sealing fluid reservoir 24 is provided, whereby sealing fluid can be topped up from the sealing fluid reservoir 24 should any sealing fluid leak out of the seal arrangement cavities 20, 22 and past the lip seals 32. An opening 26 is provided at the top 28 of the sealing fluid reservoir 24 to provide that the sealing fluid reservoir 24 is open to the atmosphere, and thereby to ensure that the pressure of the sealing fluid in the sealing fluid reservoir 24 is equal to atmospheric pressure. Sealing fluid exits the reservoir 24 via first reservoir exit port ports 56 and second reservoir exit port 58. The exit ports 56, 58 are attached to a first seal cavity supply port 66 and a second seal cavity supply port 68 respectively, via tubing (not shown). Therefore the sealing fluid enters the first seal cavity 20 via the first seal cavity supply port 66, and enters the second seal cavity 22 via the second seal cavity supply port 68.

If leakage of sealing fluid into the chamber 6 does occur, the leaked sealing fluid can be recovered from the chamber 6 by the vacuum pump 11, connected to vacuum port 8. In this manner it will first recover any sealing fluid from the bottom 10 of the chamber 6, and then automatically top-up the level of sealing fluid in the seal cavities 20, 22. Once the seal cavities 20, 22 have been topped up, any further recovered sealing fluid is then returned to the sealing fluid reservoir 24.

Figure 3:
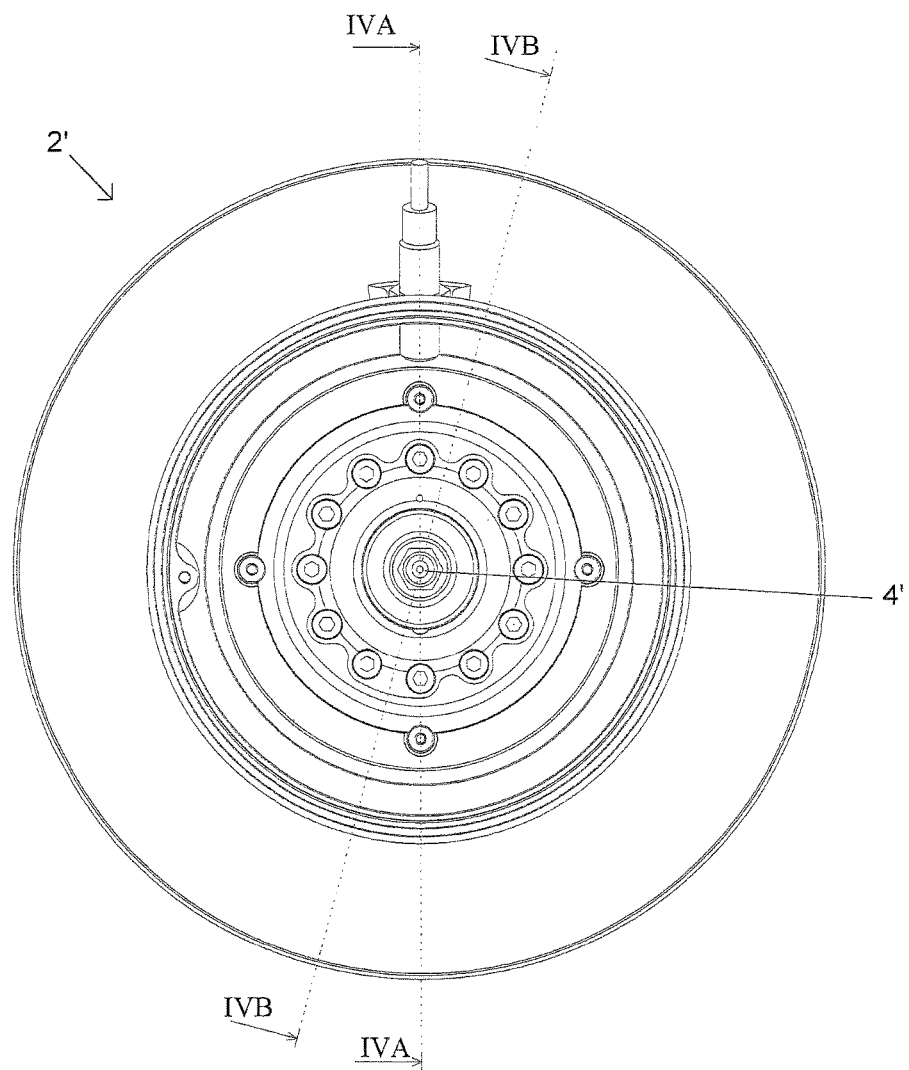
FIG. 3 is a front elevation of an alternative embodiment of flywheel in accordance with the present invention.
Figure 4A:
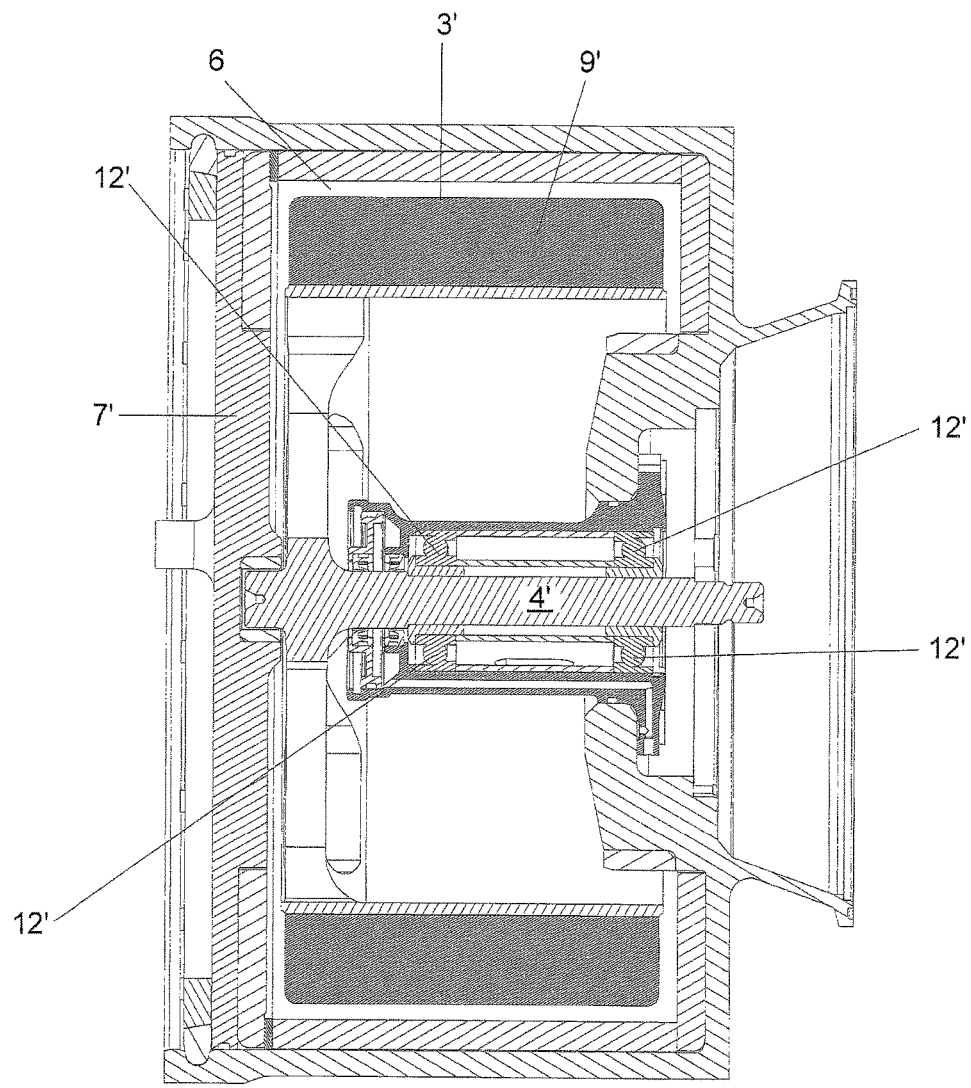
FIGS. 4a and 4b are cross-sectional views of the flywheel of FIG. 3 along the lines IVA-IVA and IVB-IVB respectively.
Figure 4B:
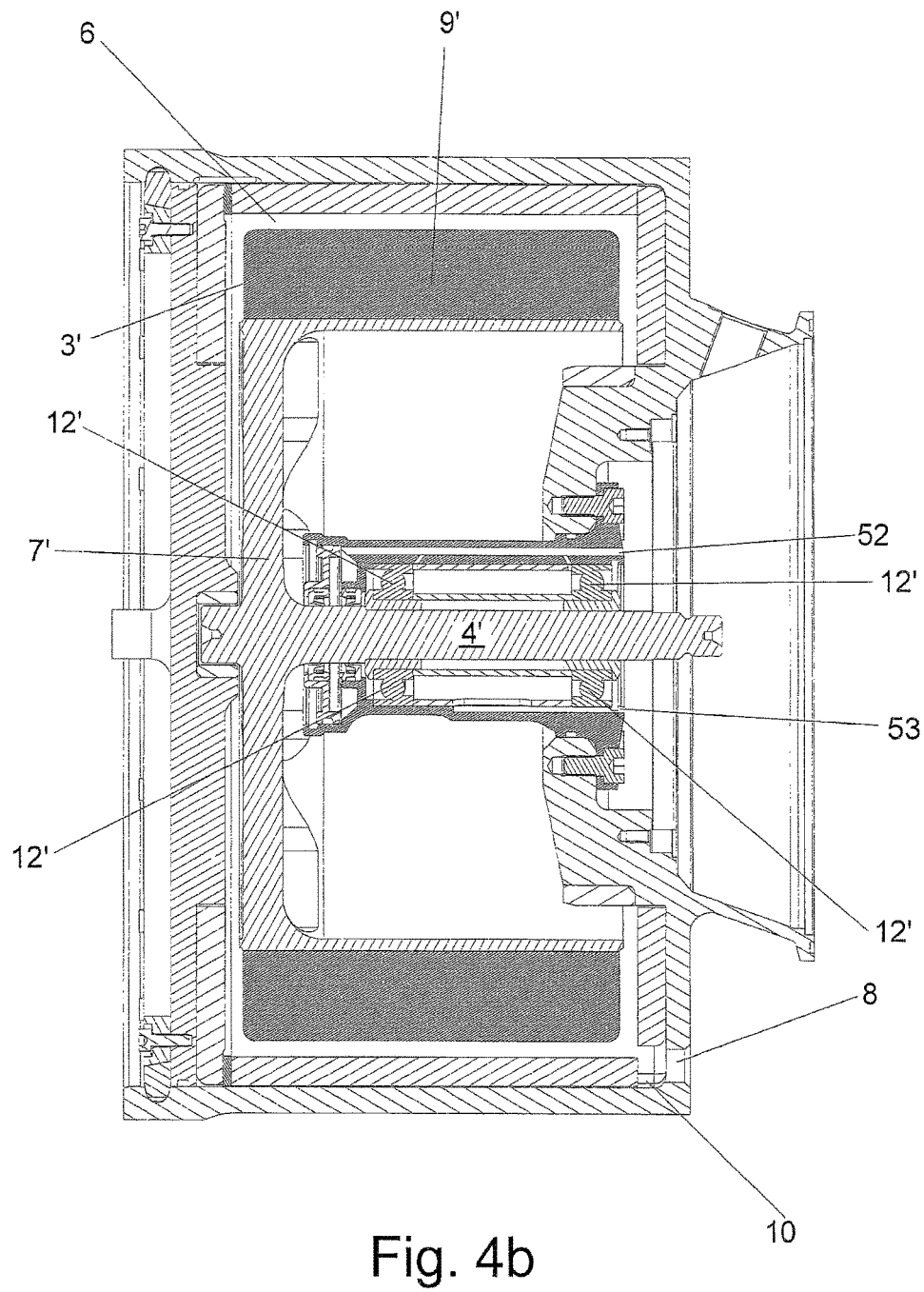
Figure 4C:
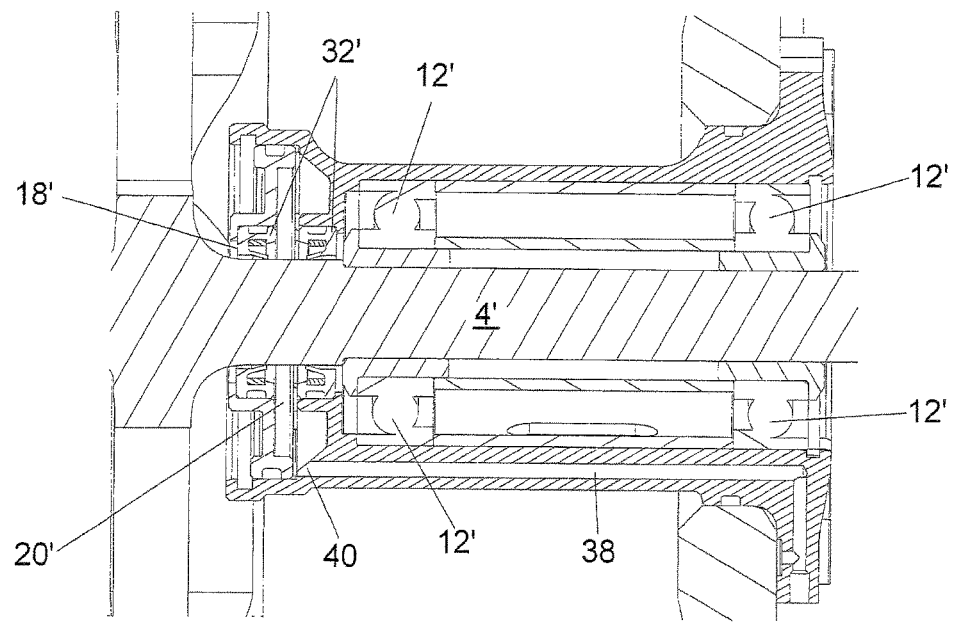
Figure 4D:
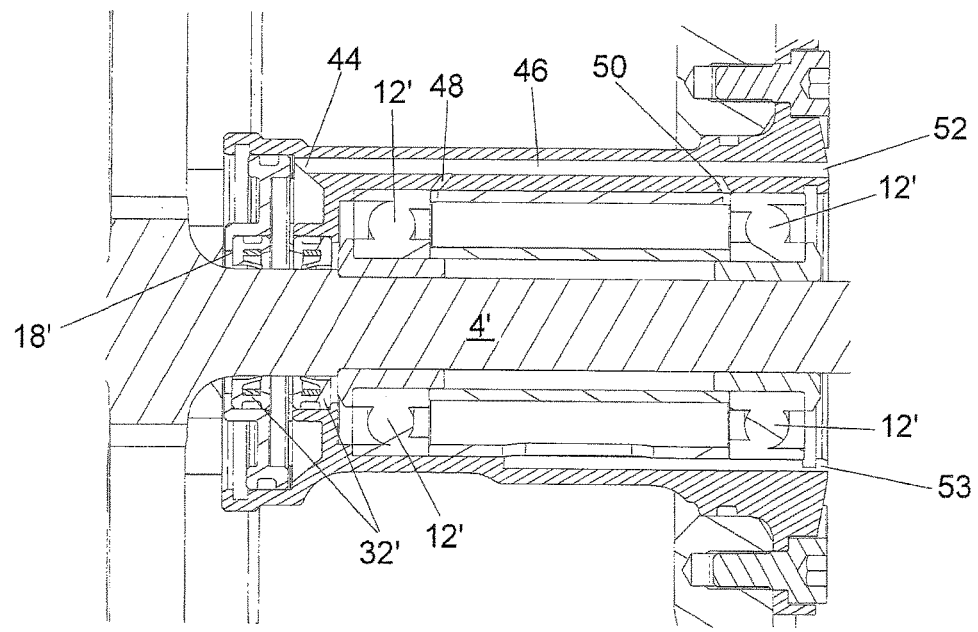
Figure 4E:
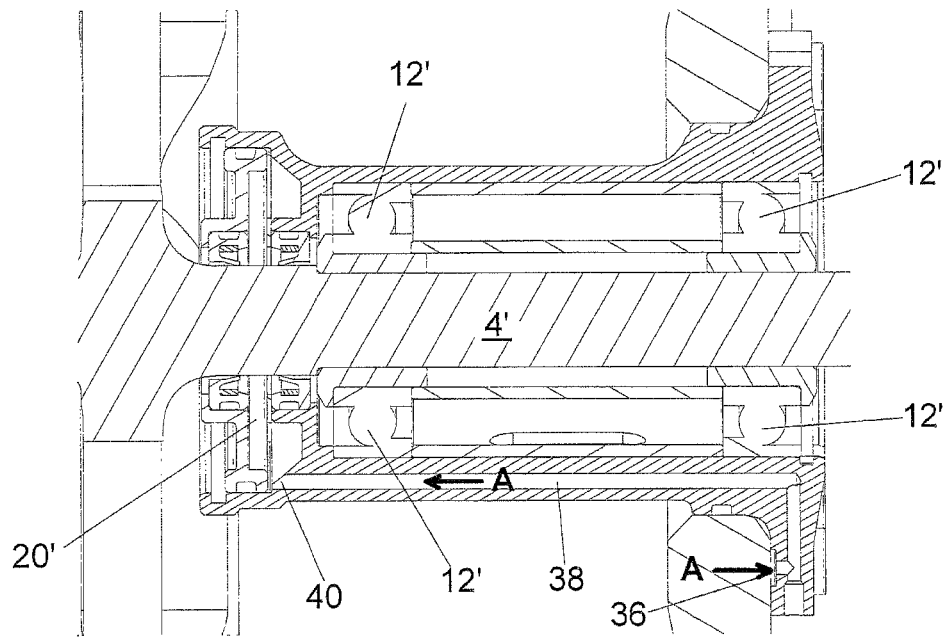
FIGS. 4e and 4f are partial cross-sectional views corresponding to FIGS. 4c and 4d respectively, illustrating the path of the sealing fluid.
Figure 4F:
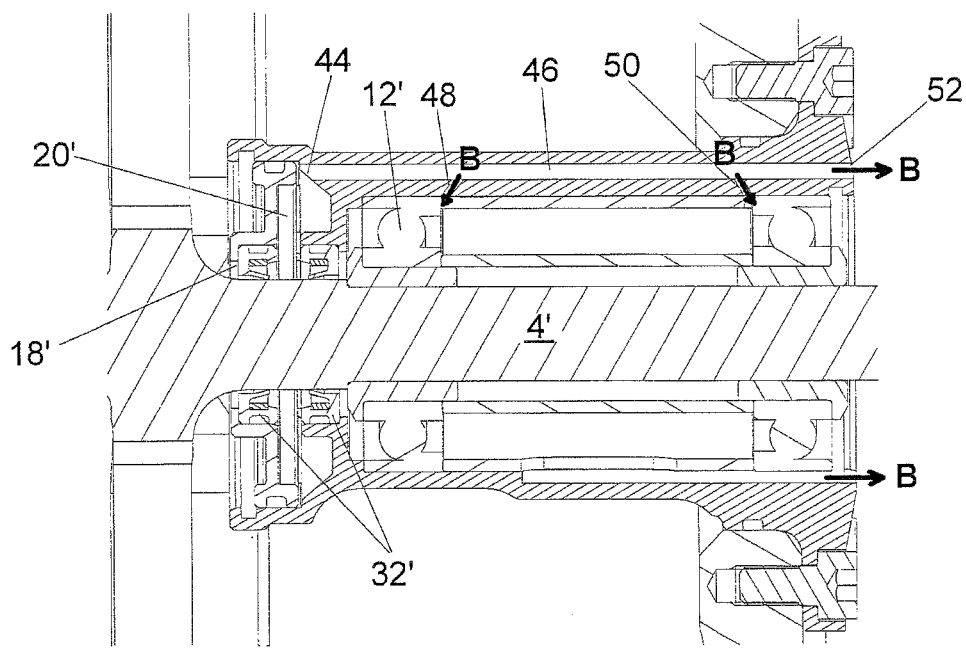

In the alternative embodiment of the present invention illustrated in FIGS. 3 to 4f, the flywheel system 2' includes a cantilevered bearing arrangement. In this embodiment, the flywheel 3' comprising rim 9' and web 7' is mounted at one end of the shaft 4', and rolling element bearings 12' are located between the web 7' of the flywheel 3' and the shaft 4'. A seal arrangement 18', comprising lip seals 32' and seal cavity 20', is positioned on the flywheel side of the bearings 12'. The flow path of the sealing fluid is illustrated in FIGS. 4e and 4f. As illustrated in FIG. 4e by the arrows 'A', the sealing fluid enters into a supply aperture 36, and flows via an entry channel 38, through an entry port 40 located near the bottom of seal cavity 20', and into the seal cavity 20'. As illustrated in FIG. 4f by the arrows 'B', the fluid exits the cavity 20' of the seal arrangement 18 via an exit port 44 located near the top of the seal cavity 20', and along an exit channel 46. Exit channel 46 is provided with two secondary channels 48, 50, which allow some of the sealing fluid to be diverted to the bearings 12' to provide lubrication and cooling. The remainder of the sealing fluid exits via the exit apertures 52 and 53. This embodiment allows a constant flow of sealing fluid through the seal cavity 20'.

Figure 5:
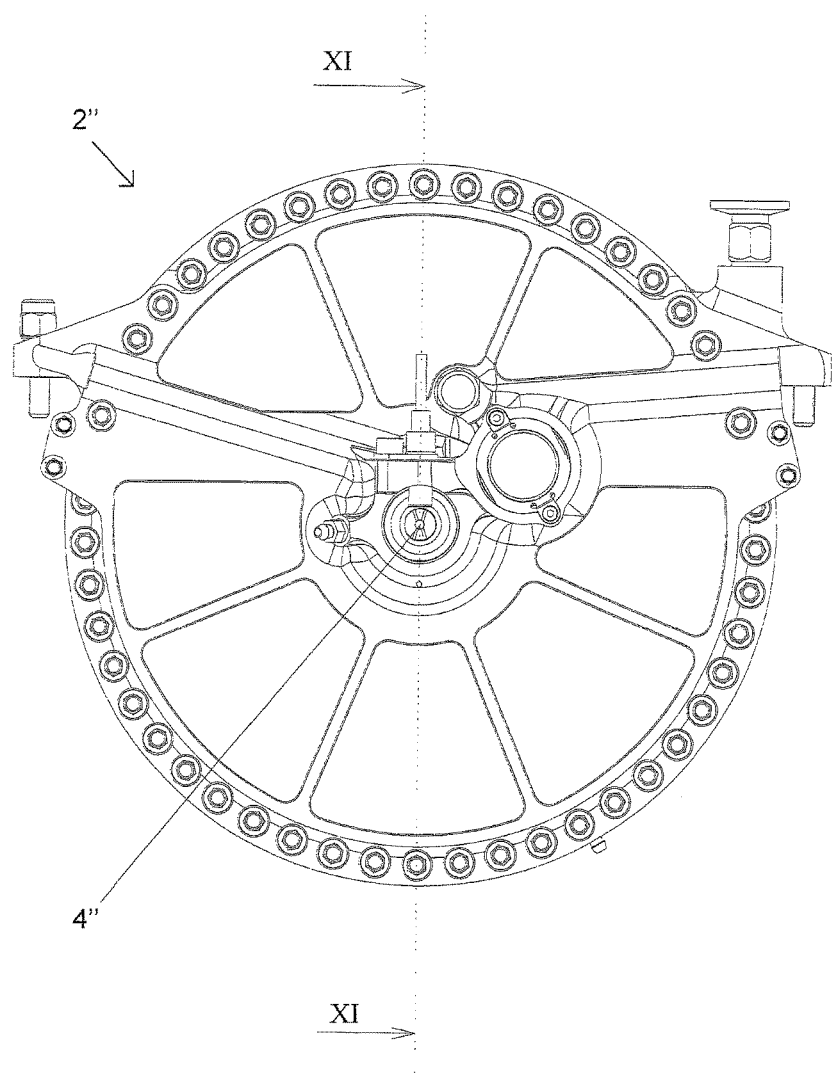
FIG. 5 is a cross-sectional view of a further alternative embodiment of a flywheel in accordance with the present invention.
Figure 6A:
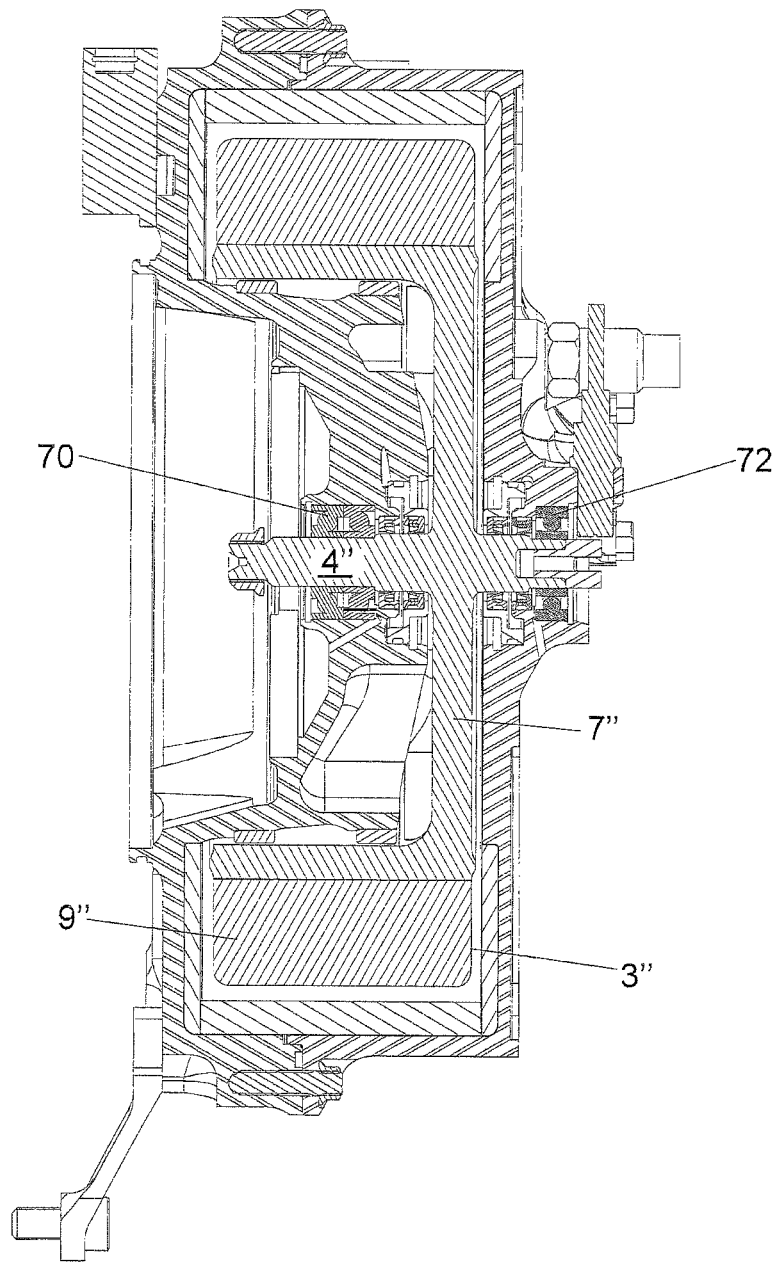
FIG. 6a is a cross-sectional view of the flywheel of FIG. 5 along the line and FIG. 6b is a partial cross-sectional view of the flywheel of FIG. 5 along the line VI-VI.
Figure 6B:
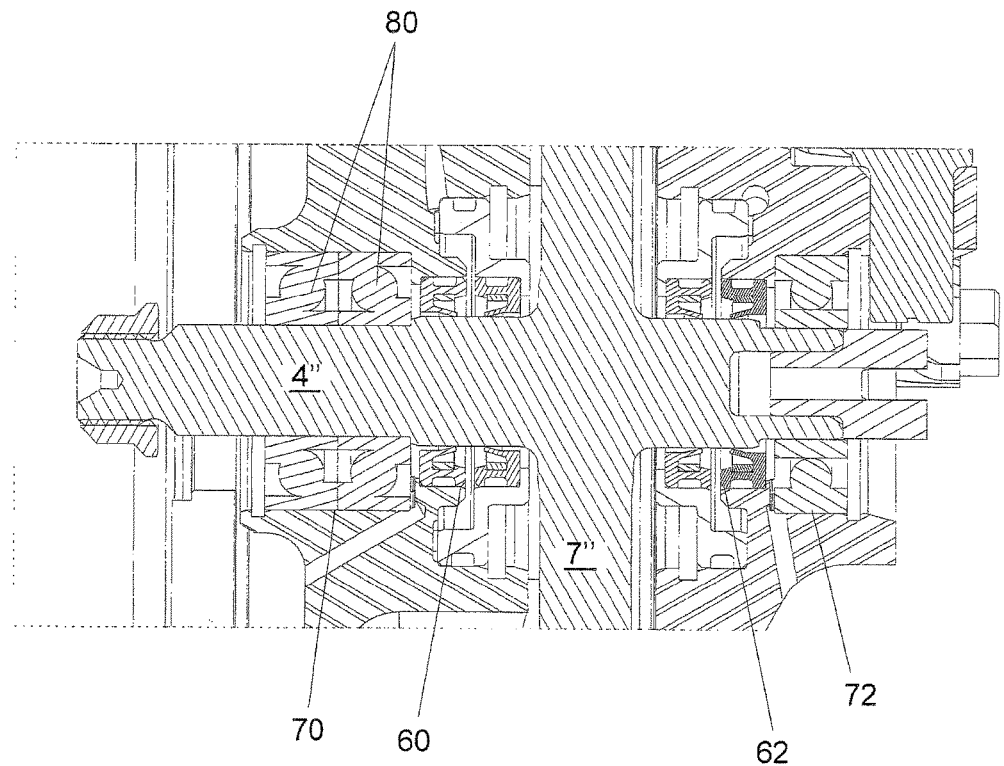

In the embodiment of FIGS. 5 to 6b, the flywheel system 2" includes a flywheel 3" comprising a rim 9" and a web 7" first bearing arrangement 70 comprising a pair of angular contact bearings 80 are positioned near one end of the shaft 4. A first seal arrangement 60 is provided between the web 7" of the flywheel 3" and the first bearing arrangement 70. The other end the shaft 4 is supported by a second bearing arrangement 72 allowing axial displacement, and a second seal arrangement 62 is located between the web 7" of the flywheel 3" of the second bearing arrangement 72.

In an alternative embodiment, the sealing fluid reservoir is topped up from a lubrication system 92 (FIG. 2*a*) for a flywheel drive mechanism 90 (FIG. 2*a*), and any sealing fluid recovered from the bottom of the chamber by the pump is returned to the lubrication system 92.

What is claimed is:

1. A high speed flywheel system comprising:
   a flywheel;
   a shaft;
   a housing,
   the flywheel being on the shaft and being located within an evacuated chamber within the housing,
   the shaft being mounted on the housing via at least one bearing arrangement comprising at least one bearing situated externally to the evacuated chamber,
   wherein the evacuated chamber is sealed by at least one seal arrangement, the at least one seal arrangement comprising a cavity for retaining sealing fluid, the cavity being delimited by two lip seals, each lip seal being arranged to encircle and form a seal against the shaft; and
   a pump arrangement arranged so as to allow recovery of sealing fluid which has leaked into the chamber,
   wherein the sealing fluid recovered from the chamber by the pump arrangement is directed to the cavity of the at least one seal arrangement to top up of the level of the sealing fluid in the cavity,
   wherein after the level of sealing fluid within the cavity has been topped up, any remaining recovered sealing fluid is directed to a sealing fluid reservoir.

2. A high speed flywheel system according to claim 1, wherein the shaft is disposed substantially horizontally, such that a rotational axis of the flywheel is also disposed substantially horizontally.

3. A high speed flywheel system as claimed in claim 1, wherein the sealing fluid reservoir is open to the atmosphere such that the pressure of the sealing fluid in the sealing fluid reservoir is equal to atmospheric pressure.

4. A high speed flywheel system as claimed in claim 1, further comprising a flywheel drive mechanism.

5. A high speed flywheel system as claimed in claim 1, wherein a first opening for supplying sealing fluid to the cavity is provided in the at least one seal arrangement, and a second opening for escape of sealing fluid from the cavity is also provided in the at least one seal arrangement, whereby a constant flow of sealing fluid through the cavity of the at least one seal arrangement is enabled.

6. A high speed flywheel system as claimed in claim 5, wherein the first opening is provided near to a base of the cavity, and the second opening is provided near to a top of the cavity.

7. A high speed flywheel system as claimed in claim 1, wherein the at least one bearing arrangement comprises two bearing arrangements located at either side of the flywheel.

8. A high speed flywheel system as claimed in claim 1, wherein the sealing fluid is directed to the at least one bearing for lubrication of the at least one bearing.

9. A high speed flywheel system as claimed in claim 1, wherein a vacuum port is provided on or near a bottom of the chamber to allow for evacuation of the chamber, and to enable recovery of sealing fluid which has leaked into the chamber.

10. A high speed flywheel system as claimed in claim 1, wherein said pump arrangement is also arranged to evacuate air from the chamber to produce a vacuum in the chamber.

11. A high speed flywheel system as claimed in claim 1, wherein the at least one bearing arrangement is adapted to support the weight of the flywheel.

12. A high speed flywheel system as claimed in claim 1, wherein the at least one bearing is located externally to the cavity.

13. A high speed flywheel system comprising:
    a flywheel;
    a shaft; and
    a housing,
    the flywheel being on the shaft and being located within an evacuated chamber within the housing,
    the shaft being mounted on the housing via at least one bearing arrangement comprising at least one bearing situated externally to the evacuated chamber,
    wherein the evacuated chamber is sealed by at least one seal arrangement, the at least one seal arrangement comprising a cavity for retaining sealing fluid, the cavity being delimited by two lip seals, each lip seal being arranged to encircle and form a seal against the shaft,
    wherein the at least one bearing arrangement comprises a first bearing arrangement comprising a pair of angular contact bearings arranged on the shaft on a first side of a web of the flywheel, and a second bearing arrangement arranged on the shaft on a second side of the web of the flywheel, wherein the second bearing arrangement is arranged so as to allow axial displacement of its at least one bearing with respect to the shaft.

14. A high speed flywheel system according to claim 13, wherein the at least one bearing is located externally to the cavity and the sealing fluid is directed to the at least one bearing for lubrication of the at least one bearing.

15. A high speed flywheel system as claimed in claim 13, further comprising a pump arrangement arranged so as to allow recovery of sealing fluid which has leaked into the chamber, wherein a vacuum port is provided on or near a bottom of the chamber to allow for evacuation of the chamber, and to enable recovery of sealing fluid which has leaked into the chamber.

16. A high speed flywheel system comprising:
    a flywheel;
    a shaft; and
    a housing,
    the flywheel being on the shaft and being located within an evacuated chamber within the housing,
    the shaft being mounted on the housing via at least one bearing arrangement comprising at least one bearing situated externally to the evacuated chamber,
    wherein the evacuated chamber is sealed by at least one seal arrangement, the at least one seal arrangement comprising a cavity for retaining sealing fluid, the cavity being delimited by two lip seals, each lip seal being arranged to encircle and form a seal against the shaft,
    wherein the at least one bearing arrangement comprises a cantilevered bearing arrangement located between the flywheel and the shaft.

17. A high speed flywheel system as claimed in claim 14, wherein the at least one bearing is located externally to the cavity and the sealing fluid is directed to the at least one bearing for lubrication of the at least one bearing.

18. A high speed flywheel system as claimed in claim 14, further comprising a pump arrangement arranged so as to allow recovery of sealing fluid which has leaked into the chamber, wherein a vacuum port is provided on or near a bottom of the chamber to allow for evacuation of the chamber, and to enable recovery of sealing fluid which has leaked into the chamber.

19. A high speed flywheel system comprising:
- a flywheel;
- a shaft;
- a housing,
- the flywheel being on the shaft and located within an evacuated chamber within the housing,
- the shaft being mounted on the housing via at least one bearing arrangement comprising at least one bearing situated externally to the evacuated chamber,
- wherein the evacuated chamber is sealed by at least one seal arrangement, the at least one seal arrangement comprising at least one lip seal arranged to encircle and form a seal against the shaft in cooperation with sealing fluid supplied to the at least one seal arrangement, wherein the sealing fluid lubricates the at least one bearing,
- wherein the at least one lip seal comprises two lip seals, the two lip seals being arranged to delimit a cavity for retaining sealing fluid; and
- a flow path of sealing fluid through the at least one seal arrangement, wherein sealing fluid is diverted from said flow path and directed to the at least one bearing arrangement for lubrication of the at least one bearing,
- wherein the flow path comprises an entry port provided near to a base of the cavity of the at least one seal arrangement, and an exit port provided near to a top of the cavity of the at least one seal arrangement, wherein sealing fluid is supplied to the cavity via the entry port, and sealing fluid can escape from the cavity via the exit port, whereby a constant flow of sealing fluid through the cavity of the at least one seal arrangement is enabled.

20. A high speed flywheel system as claimed in claim 19, wherein the flow path further comprises an exit channel in fluid communication with the exit port, said exit channel being provided with at least one secondary channel adapted to divert sealing fluid to the at least one bearing arrangement for lubrication of the at least one bearing.

21. A high speed flywheel system as claimed in claim 19, wherein the at least one bearing is located externally to the cavity and the sealing fluid is directed to the at least one bearing for lubrication of the at least one bearing.

22. A high speed flywheel system as claimed in claim 19, further comprising a pump arrangement arranged so as to allow recovery of sealing fluid which has leaked into the chamber, wherein a vacuum port is provided on or near a bottom of the chamber to allow for evacuation of the chamber, and to enable recovery of sealing fluid which has leaked into the chamber.

\* \* \* \* \*